(12) United States Patent
Powderly et al.

(10) Patent No.: US 6,560,641 B1
(45) Date of Patent: May 6, 2003

(54) SYSTEM, METHOD, AND ADAPTER CARD FOR REMOTE CONSOLE EMULATION INCLUDING REMOTE CONTROL OF A PERIPHERAL DEVICE

(75) Inventors: Terrence W. Powderly, East Fallowfield, PA (US); Joseph W. Zabaga, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/538,004

(22) Filed: Mar. 29, 2000

(51) Int. Cl.[7] .............................................. G06F 17/30
(52) U.S. Cl. ........................................ 709/219; 707/10
(58) Field of Search ................................ 709/217, 218, 709/219

(56) References Cited

U.S. PATENT DOCUMENTS

| | | | |
|---|---|---|---|
| 5,136,695 A | 8/1992 | Goldshlag et al. | 395/275 |
| 5,410,706 A | 4/1995 | Farrand et al. | 395/700 |
| 5,590,315 A | 12/1996 | Hess et al. | 395/500 |
| 5,604,509 A | 2/1997 | Moore et al. | 345/2 |
| 5,712,978 A | 1/1998 | Lerner et al. | 395/200.11 |
| 5,721,842 A | 2/1998 | Beasley et al. | 395/311 |
| 5,732,212 A | 3/1998 | Perholtz et al. | 395/200.11 |
| 5,764,974 A | 6/1998 | Walster et al. | 395/606 |
| 5,794,239 A | 8/1998 | Walster et al. | 707/6 |
| 5,825,336 A | 10/1998 | Fujita et al. | 345/2 |
| 6,128,731 A * | 10/2000 | Zarrin et al. | 713/1 |
| 6,230,194 B1 * | 5/2001 | Frailong et al. | 709/220 |
| 6,381,700 B1 * | 4/2002 | Yoshida | 713/201 |
| 6,393,492 B1 * | 5/2002 | Cornaby et al. | 709/321 |
| 6,415,289 B1 * | 7/2002 | Williams et al. | 707/10 |
| 6,442,549 B1 * | 8/2002 | Schneider | 707/10 |

* cited by examiner

Primary Examiner—David Wiley
Assistant Examiner—Phouc H. Nguyen
(74) Attorney, Agent, or Firm—Lise A. Rode; Michael B. Atlass; Mark T. Starr

(57) ABSTRACT

A system, method, and adapter card for providing, via a network, emulation of a console of a host computer system on another, remotely located computer system on the network, includes the ability to remotely control a peripheral device connected to a peripheral device interface controller on the adapter card. The adapter card further comprises a processor, a network interface controller providing a connection to the network, a communications client program executing on the processor, and at least one computer-readable medium having stored therein a modified BIOS extension for said peripheral device interface controller. The modified BIOS extension comprises first program code and second program code, the second program code being embedded within the first program code and defining a separate server program. Upon selection by a user at the remote computer system, the modified BIOS extension is loaded into the host memory during execution of the host computer system BIOS, in place of the standard BIOS extension for the peripheral device interface controller. When executed by the host processor, the first program code of the BIOS extension (i) copies the second program code defining the server program to a new location in the host memory, and then (ii) hooks the new location of the server program to an interrupt of the host computer system to cause the host processor to initiate execution of the server program on the host computer system upon a subsequent occurrence of that interrupt. The server program establishes communications with the communications client program on the adapter card, and, thereafter, upon receipt of requests from the communications client program, invokes functions of the host computer system BIOS to control the peripheral device.

30 Claims, 8 Drawing Sheets

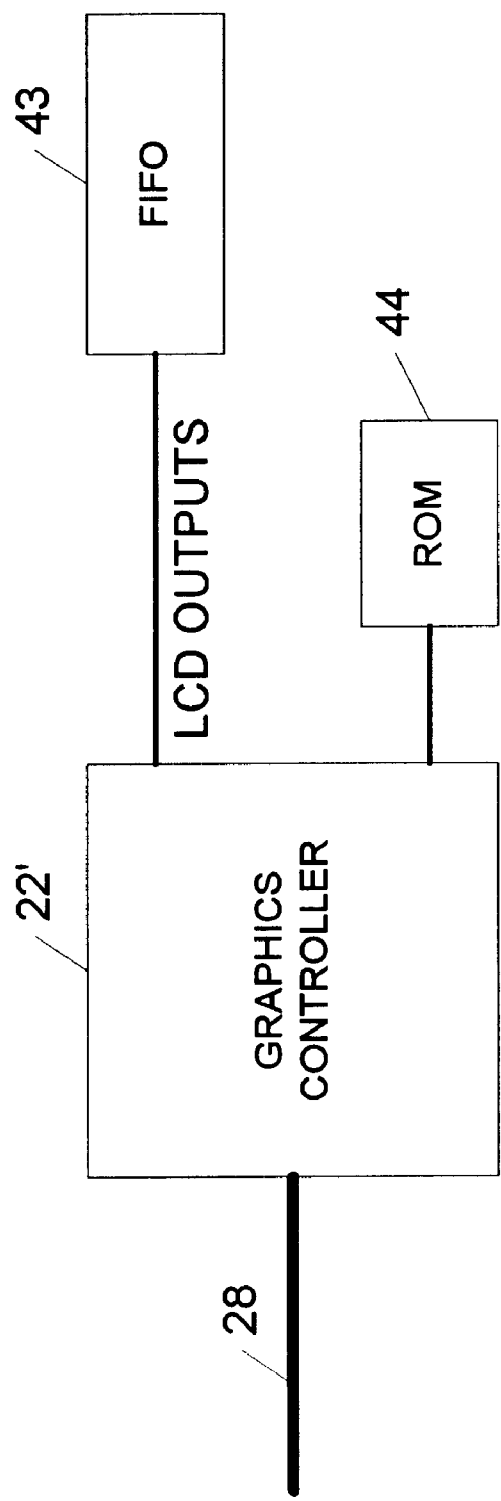

SYSTEM, METHOD, AND ADAPTER CARD FOR REMOTE CONSOLE EMULATION INCLUDING REMOTE CONTROL OF A PERIPHERAL DEVICE

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention is directed to computer systems, and more particularly, to remote emulation of a host computer system console.

BACKGROUND

Large computer systems, including mainframes and enterprise servers, have traditionally included a primary console to enable system administrators to configure and administer the computer system. These primary consoles typically take the form of a monitor, keyboard, and often a pointing device, such as a mouse, attached locally to the computer system. In some cases, the primary console comprises a small workstation that is tightly coupled to the larger computer system.

In order to provide additional flexibility and ease of administration of a large computer system, remote consoles have been provided that emulate the primary console of the computer system on a remote workstation over a modem or network connection. Typically, video information representing the screen of the primary console is captured and transmitted over the network to the remote workstation, which uses the information to reproduce the screen of the primary console on the remote workstation. Keystroke and mouse input at the remote workstation is transmitted to the host computer system and inserted into the system keyboard controller. A system administrator is thus able to administer and configure the computer system from the remote location as if using the primary console of the computer system.

Co-pending application Ser. No. 09/310,542, filed May 12, 1999, entitled "System and Adapter Card for Remote Console Emulation," describes an adapter card for remote console emulation that combines a graphics controller, a network interface controller, and a peripheral device interface controller. A remote client program executes on a remote computer system that connects to the network interface controller of the adapter card via a network. The remote client program receives video information from the adapter card via the network and uses that information to produce a representation of the console screen of the host computer on a display at the remote location.

An additional feature described in the co-pending application relates to the peripheral device interface controller on the adapter card which, in the preferred embodiment described therein, comprises a Small Computer Systems Interface (SCSI) controller. In one mode of operation, the adapter card allows the host operating system to control the peripheral device interface controller, allowing the host operating system to use the interface as it would any other adapter-based peripheral device interface. Thus, peripheral devices, such as disk drives, scanners, printers, and the like can be connected to the peripheral device interface and can be operated with the host computer system in the typical manner.

In a second mode of operation, a user at the remote computer system can choose instead to have a processor on the adapter card take control of the peripheral device interface controller. This allows the user at the remote location to access devices attached to the peripheral device interface, such as disk drives and the like, directly. As described in the co-pending application, this is achieved by setting a flag variable stored on the adapter card. When the host computer system, and hence the adapter card, is started, the processor on the adapter card examines the flag to determine whether it should take control of the peripheral device interface or whether the first computer system should take control. If the adapter card processor is to take control, the processor causes a modified BIOS for the peripheral device interface to be loaded by the host computer system that halts the execution of the system BIOS of the host computer system in order to allow the processor on the adapter card to take control of the peripheral device interface controller.

One disadvantage with the approach taken above is that, because the adapter card halts execution of the host BIOS in order to allow the processor to take control of the peripheral device interface, a software driver for the peripheral device interface must be developed for the particular processor and operating system on the adapter card. In many cases, such a driver may not be readily available from the peripheral device interface manufacturer, and, therefore, a significant development effort may be required to develop a suitable driver. Accordingly, it would be desirable if the need for a software driver on the adapter card could be eliminated. The present invention satisfies this need.

SUMMARY

The present invention is directed to a system, method, and adapter card for providing emulation (i.e., remote control) of a console of a host computer system from another computer system remotely located on a network, including in particular, remote control of a peripheral device, such as a data storage device, connected to the host computer system. The adapter card comprises a processor, a network interface controller providing a connection to the network, a peripheral device interface controller to which the peripheral device is connected, a communications client program executing on the processor, and at least one computer-readable medium having stored therein a modified BIOS extension for said peripheral device interface controller. The modified BIOS extension comprises first program code and second program code, the second program code being embedded within the first program code and defining a separate server program. Upon selection by a user at the remote computer system, the modified BIOS extension is loaded into the host memory during execution of the host computer system BIOS, in place of the standard BIOS extension for the peripheral device interface controller. When executed by the host processor, the first program code of the BIOS extension (i) copies the second program code defining the server program to a new location in the host memory, and then (ii) hooks the new location of the server program to an interrupt of the host computer system to cause the host processor to initiate execution of the server program on the host computer system upon a subsequent occurrence of that interrupt. The server program establishes communications with the communications client program on the adapter card, and, thereafter, upon receipt of requests from the communications client program, invokes functions of the host computer system BIOS to control the peripheral device. Preferably, the first program code hooks the server program to the host computer system bootstrap loader interrupt, in which case the server program is executed in place of the host bootstrap loader, allowing remote control of the peripheral device in the absence of the host operating system.

In accordance with a preferred use of the present invention, the communications client and server program are employed to control one or more data storage devices connected to the peripheral device interface, including (i) selecting one of the disk drives, (ii) partitioning the selected disk drive, and (iii) copying a bootable disk image to the selected disk drive, in the absence of the host operating system.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 1A is a block diagram illustrating an alternative embodiment of the adapter card of FIG. 1;

DETAILED DESCRIPTION OF THE PREFERRED EMBODIMENT

Figure 1:
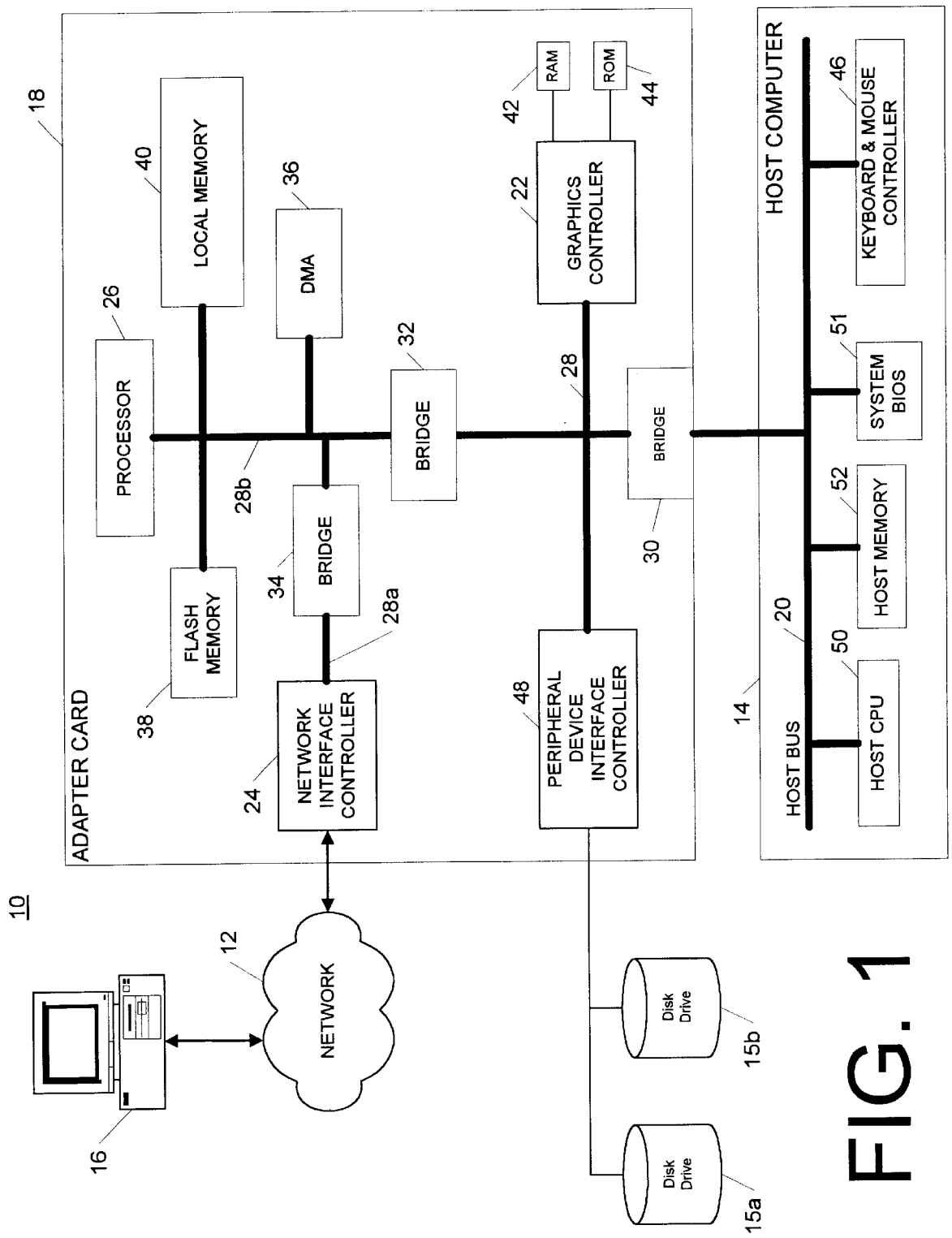
FIG. 1 shows one embodiment of a system according to the present invention, including an adapter card for emulating a host computer system console at a remote location.

Portions of the present invention may take the form of program code (i.e., instructions) embodied in tangible media, such as floppy diskettes, CD-ROMs, hard drives, or any other computer or machine-readable storage medium, wherein, when the program code is loaded into and executed by a machine, such as a computer, the machine becomes an apparatus for practicing the invention. Portions of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The present invention is directed to a system, method, and adapter card for providing emulation (i.e., remote control) of a console of a host computer system from another computer system remotely located on a network, including in particular, remote control of a peripheral device, such as a data storage device, connected to the host computer system. As described hereinafter, the present invention is intended for use with host computer systems having a binary input/output system (BIOS) that supports the loading of BIOS extensions into the host memory for execution by the host processor. Host computer systems of this type include personal computers, workstations, and servers based on the industry standard PC architecture, which typically employ one or more Intel® microprocessors, such as the Pentium® or Itanium™ families of microprocessors, and which typically support one or more of the Industry Standard Architecture (ISA), Extended Industry Standard Architecture (EISA), and Peripheral Component Interconnect (PCI) input/output (I/O) bus architectures.

As additional background information, computer systems based on the industry standard PC architecture can be viewed as a series of layers. The lowest layer is the actual hardware. The highest layer is the application program that interacts with the user. Between the hardware and application program layers is a layer of system software. System software typically includes the operating system and various devices drivers. The industry standard PC architecture used in personal computers, workstations, and servers today, includes an additional low-level software layer between the hardware and the system software. This low-level software layer is commonly referred to as the Basic Input/Output System (BIOS). The BIOS insulates the system and application software from the hardware and provides primitive I/O services and the ability to program the hardware's interrupt handling.

The system BIOS in computers and servers based on the industry standard PC architecture has the ability to extend or modify portions of the BIOS code with so-called BIOS extensions, sometimes also referred to as expansion ROMs or option ROMs. In the case of an adapter card, for example, a BIOS extension can be provided on the card to provide additional BIOS level control of certain low-level features of the card. For example, such BIOS extensions are commonly found on SCSI, video, and network interface adapter cards. When the host system BIOS executes its power-on self-test (POST), it searches for any BIOS extension code provided on any adapter cards connected to its input/output bus. If a BIOS extension is located, the host loads the BIOS extension code into its host memory for execution (a process sometimes referred to as "shadowing"). After executing the BIOS extension code, the system BIOS completes its normal POST execution, which typically concludes with the booting of the operating system.

As still further background information, computers and servers based on the industry standard PC architecture are mainly controlled through the use of interrupts. Interrupts can be generated by the processor, other hardware devices, or the software. When an interrupt occurs, control of instruction execution transfers to a software routine, commonly referred to as an interrupt handling routine, that provides an appropriate programmed response to the interrupt. Each interrupt is assigned its own unique interrupt number, and each interrupt number is associated with its respective interrupt handling routine by an interrupt vector that specifies the address in the host memory or system BIOS of the interrupt handling routine.

A table of interrupt vectors is created by the system BIOS during its POST routine. The system BIOS creates the interrupt vector table in host memory from a ROM-based table and initializes the vector addresses of the low-level interrupt handling routines of the BIOS. Afterwards, the operating system boots and initializes any of the vector addresses of interrupts that are reserved for it. Likewise, an application program that issues its own interrupts must initialize the associated vector addresses in the table. A process known as "hooking an interrupt" can be used by software to replace an already established interrupt vector address with a new address of a different interrupt handling routine to alter the system response to that particular interrupt—the original interrupt vector address for that interrupt number is replaced in the interrupt vector table with the new address.

Microprocessor interrupts are invoked by the processor as a result of some unusual program result, such as an attempt to divide by zero. In the standard PC architecture, interrupt numbers 00 h–04 h (typically designated INT 00 h–04 h) are reserved for the processor. Hardware interrupts are invoked by peripheral devices that set their respective interrupt request lines (IRQ). Each time a key is pressed, for example, the keyboard hardware generates an interrupt. Hardware interrupts are vectored to Interrupt Service Routines (ISRs), a form of interrupt handling routine, that generally reside in the system BIOS. INTs 08 h–0Fh and 70 h–77 h are reserved by the system BIOS for hardware interrupts. Lastly, software interrupts are invoked via the 80×86 INT instruction. Most software interrupts are vectored to Device Service Routines (DSRs), another form of interrupt handling routine, located in the BIOS, in the operating system, or in an application program.

Referring to the drawings, wherein like numerals represent like elements throughout, FIG. 1 shows a preferred embodiment of a system 10 for providing remote control or emulation of a console of a host computer system 14 from another, remotely located computer system 16 over a network 12 (such as, for example, the Internet). According to one important feature of the present invention described more fully below, the system 10 enables a user at the remote computer system 16 to remotely control a peripheral device, such as a data storage device, connected to the host computer system, in the absence of the host operating system.

The host computer system 14 is a personal computer, workstation, or server based on the industry standard PC architecture. The host computer system 14 comprises a host processor 50, which may comprise, for example, one or more Intel® Pentium® or Intel® Itanium™ processors, a host memory 52, which typically is a random access memory (RAM), and at least one host input/output (I/O) bus 20, such as an ISA, EISA, or PCI bus. For purposes of illustrating a preferred embodiment of the present invention, it will be assumed that the Host I/O bus 20 is a PCI bus based on Revision 2.1 of the PCI specification.

The host computer system 14 also has a system BIOS 51 in the form of code stored in a read-only memory. BIOS code for host computer systems based on the industry standard PC architecture is available from a variety of manufacturers, including Phoenix Technologies Ltd. and American Megatrends, Inc. Numerous publications are available providing information concerning the industry standard features of such BIOS code, including, for example, System BIOS for IBM PCs, Compatibles, and EISA Computers: the complete guide to ROM-based system software, Second Edition, © 1991 Phoenix Technologies Ltd., which is incorporated herein by reference in its entirety.

The system 10 of the present invention comprises an adapter card 18 that connects to the input/output (I/O) bus 20 of the host computer system 14 and a remote client program, described hereinafter, executing on the remote computer system 16. The adapter card 18 and the remote client program running on the remote computer system 16 replace the need for the direct attachment of a monitor, mouse and keyboard (i.e., a primary console) to the host computer system 14. Instead, they enable the console to be emulated on a remote computer system anywhere that network connections can be made.

The Adapter Card

In the present embodiment, the adapter card 18 has been designed for use in a host computer system 14 in which the I/O bus 20 is a Peripheral Component Interconnect (PCI) bus, specifically one that is compliant with version 2.1 of the PCI specification. However, it is understood that the present invention is by no means limited to use with PCI-based I/O buses, but rather, can be employed in any I/O bus environment, including, for example, other industry-standard bus specifications, such as Industry Standard Architecture (ISA) and Extended ISA (EISA), and proprietary I/O bus implementations.

Remote Console Functionality

According to one embodiment of the adapter card 18 of the present invention, the adapter card 18 comprises a graphics controller 22, a network interface controller 24, and a processor 26, all co-located on the printed circuit board of the adapter card. The graphics controller 22, network interface controller 24, and processor 26 each interface to a local bus 28 on the adapter card. A bridge circuit 30, which in the present embodiment comprises a PCI-to-PCI bridge, provides a bridge between the local bus 28 of the adapter card 18 and the I/O bus 20 of the host computer system 14.

In the present embodiment, the processor 26 is indirectly interfaced to the local bus 28 via a second bridge circuit 32. The network interface controller 24 is indirectly interfaced to the local bus 28 via bridge circuit 30 and a third bridge circuit 34. In this manner, the network interface controller 24 is isolated on a separate local bus segment 28a. Because of this isolation, network traffic will not add load to the main local bus segment 28 over which the graphics controller 22 communicates with the processor 26 and host I/O bus 20. It is understood, however, that in other embodiments, one or both of the network interface controller 24 and processor 26 may be directly connected to the main local bus segment 28. Accordingly, in this regard, the present invention is by no means limited to the implementation shown.

In the present embodiment, the graphics controller 22 supports the Video Graphics Array (VGA) standard. According to the present invention, at least one adapter card 18 functions as the installed graphics controller for the host computer system 14; the operating system of the host computer system 14 accesses the graphics controller 22 of the adapter card as it would any standard VGA graphics card using standard operating system drivers. In the present embodiment, the graphics controller 22 has an associated video memory 42 that stores information representing the console screen of the host computer system 14 and an associated read-only-memory (ROM) 44 in which the VGA BIOS may be stored. Graphics controllers from a variety of manufactures may be used to implement the graphics controller 22. For example, in one embodiment, the graphics controller 22 can be implemented using the CL-GD5465 graphics controller chip manufactured by Cirrus Logic, Inc. Also, while in the present embodiment, the graphics controller 22 supports the VGA standard, in other embodiments, graphics controllers that implement other or future standards may be employed.

In the present embodiment, the network interface controller 24 implements the 10/100 BaseT Ethernet protocol, however, in other embodiments, other networking protocols can be employed. In the present embodiment, the network interface controller 24 is implemented using an Intel® 21143 and a 10/100 Base-TX transceiver. The 21143 supports the MAC layer for both 10 BaseT and 100 BaseT. The 10/100 Base-TX transceiver provides the capability to auto-detect the speed of the network and to select 100 BaseT where possible. This combination enables the network interface controller 24 to support 10/100 BaseT full duplex Ethernet with automatic detection of speed and simplex/duplex operation. The network interface controller 24 employs Transmission Control Protocol/Internet Protocol (TCP/IP) over the Ethernet to communicate with the remote client program on the remote computer system 16, as described more fully below.

In the present embodiment, the processor 26 has an associated flash memory 38, in which operating system and program code that the processor 26 executes is stored, and an associated local random-access memory 40, both of which interface to the processor 26 via local bus segment 28b. A memory controller 36, such as a Direct Memory Access controller (DMA), may also be interfaced to the bus segment 28b to control memory transfers to and from the local memory 40. In the present embodiment, the processor 26 is implemented using an i960® RP microprocessor available from Intel Corporation, which incorporates the functionality of the processor 26, the bridges 32 and 34, and the DMA controller 36 in a single semiconductor chip package in which the local bus segment 28b is internal to the chip package. Also in the present embodiment, the i960® RP processor operates under the control of the VxWorks® real-time operating system (RTOS) available from Wind River Systems. The operating system code is stored in the flash memory 38. Upon reset of the i960® RP processor, the processor loads and boots the VxWorks operating system. In other embodiments, the particular microprocessor and operating system therefor may be different. Moreover, while the functionality of the bridges 32 and 34 and the DMA controller 36 are included in a single chip package in the i960® RP processor, in other embodiments, these functional units may be implemented using separate, discrete components.

In use, the foregoing components, in combination with program code, described hereinafter, executed by the processor 26, operate to reproduce the console screen of the host computer system 14 on a monitor (or other display) of the remote computer system 16 and to pass keystrokes and mouse movement and click information gathered at the remote computer system 16 to the host computer system 14. In greater detail, in the present embodiment, the processor 26 determines changes in the representation of the console screen generated by the graphics controller 22, and information about the changes is then packaged, with header information, into TCP/IP segments and transmitted to the remote client program over the network 12 via the network interface controller 24. The remote client program interprets the received information and based on that information is able to reproduce the console screen on the monitor of the remote computer system 16, thus effectively mimicking what would have been displayed on a local console screen at the host computer system 14. Simultaneously, the remote client program captures keystroke and mouse movement and click information at the remote computer system 16, packages the information, with header information, into TCP/IP segments, and transfers the information to the adapter card 18 over the network 12. The keyboard and mouse information is received by the network interface controller 18 and passed to the processor 26. The processor converts this information into keyboard/mouse controller queue entries and places the entries into the Keyboard/Mouse Controller of the host computer system 14, where they are detected by the host computer system 14 as if they had come from a locally attached keyboard and mouse.

Because the graphics controller 22, processor 26, and network interface controller 24 are all co-located on the adapter card 18, communication among them over the local bus 28, 28a, 28b does not impact the performance of the I/O bus 20 of the host computer system 14.

In the present embodiment, the processor 26 runs two main processes to perform the foregoing functionality, both of which are implemented in program code that the processor 26 executes. The program code is preferably stored in flash memory 38. The first of these processes comprises a Web server that enables a user to interact with the adapter card 18 from the remote client program for purposes of administration, configuration and control of the adapter card 18. These administrative, configuration and control function choices are presented to the user as HyperText Markup Language (HTML) pages that the Web server serves to the remote client program. The second process that the processor 26 runs is a VG_remoter( ) process. This process is responsible for determining changes in the representation of the console screen (generated by the graphics controller 22 in response to commands from the host computer system 14), packaging information representing those changes into TCP/IP segments, and sending the TCP/IP segments to the remote client program. The VGA_remoter( ) process is additionally responsible for receiving keystroke and mouse movement information from the remote client, converting that information into keyboard/mouse controller queue entries, and then placing those entries into the keyboard/mouse controller 46 of the host computer system 14.

The step of determining changes in the representation of the console screen generated by the graphics controller 22 can be implemented in a variety of ways. For example, as mentioned above, in one embodiment, the graphics controller 22 is implemented using the CL-GD5465 graphics controller chip manufactured by Cirrus Logic, Inc. An advantageous feature of the CL-GD5465 graphics controller is that certain internal registers of the chip, including the standard VGA registers and some extended registers, are all accessible in memory as a linear list. Taking advantage of this feature, in this embodiment, the processor 26 first samples the state registers on the graphics controller 22 to determine the current VGA mode (i.e., text or graphics) of the graphics controller 22. Then, based on the VGA mode, text or graphics information (representing the console screen of the host computer system 14) is copied from the video memory 42 of the graphics controller 22 to the local memory 40 of the processor 26. In the present embodiment, this transfer is controlled by the DMA controller 36. The processor 26 then compares the current text or graphic information with previously sampled information to determine any changes in the console screen representation. Specifically, in the present embodiment, the current frame is compared to a previous frame to identify changes in pixel values. Information concerning these changes is then packaged in TCP/IP segments and transmitted to the remote client program. In the present embodiment, the TCP/IP segments include a header followed by the body of the segment. For graphics mode, the header indicates which refresh line(s) are being sent in the body of the segment, and the body of the segment contains the new pixel values for those line(s). In text mode, the header indicates that the body of the segment contains text indices, and the actual indices are carried in the body of the segment. Other information that can be provided in the header includes, for example, indices into a particular text font (for text mode), or indices into a color pallet (text or graphics). As can be appreciated, the system of the present invention works equally well in both text and graphics modes.

Other graphics controllers do not provide the same capability to read the internal state registers as the Cirrus Logic CL-GD5465 controller provides. Indeed, with many graphics controllers, the state registers can only be read in conjunction with a write to the state registers. Thus, alternative approaches to determining changes in the console screen image may be required.

In one alternative embodiment in which it is not possible to read the state registers of the graphics controller 22 non-destructively, the processor 26 can be programmed to intercept the addresses, data, and commands that the host computer system 14 attempts to write to the graphics controller. The intercepted information can then be used to determine the state of the graphics controller. Once analyzed in this manner, the information is passed onto the graphics controller 22 as if it had come directly from the host. The processor 26 can then sample the information in the video memory 42 and compare it to a previous sample to determine the changes in the console screen image. Those changes can then be packaged and transmitted to the remote client program in the same manner as described above, so that the client can mimic the changes on the monitor at the remote computer system 16.

FIG. 1A illustrates yet another alternative embodiment, in which the graphics controller 22' is implemented using a chip that is intended for use with Liquid Crystal Display (LCD) screens. In addition, a first-in, first-out (FIFO) buffer 43 is attached to the outputs that are normally connected to an LCD display screen. The data in the FIFO can then periodically be sampled to determine what data the graphics controller 22' is trying to write to its LCD outputs. This data would include the raw graphics data and certain screen placement information (depending on the type of LCD screen with which the chip is designed to work, certain signals are typically available that indicate, for example, where to gate each successive batch of pixel data). Thus, in this embodiment, the FIFO 43 takes the place of an LCD display. Although the VGA mode could not be determined from this information, most graphics controllers for LCD monitors allow the shape of the screen to be preset, and therefore, the processor 26 can monitor when the top of the screen is being refreshed. From the information captured in the FIFO 43, the processor 26 can determine what changes to the console screen have occurred between successive samples. The changes can then be packaged and transmitted to the remote client program in the same manner as described above, so that the client can mimic the changes on the monitor at the remote computer system 16.

Referring again to FIG. 1, it should be noted that depending on the capabilities and features of the graphics controller used to implement controller 22, in some embodiments, a single memory may be shared by both the processor 26 and the graphics controller 22, thus replacing the separate memories 40 and 42 shown in FIG. 1 with a single memory.
Remote Control of Peripheral Devices in the Absence of a Host OS Still referring to FIG. 1, the adapter card 18 further comprises a peripheral device interface controller 48 to which peripheral devices can be connected and through which the host computer system 14 can access the peripheral devices. In the preferred embodiment, the peripheral device interface controller 48 comprises a Small Computer Systems Interface (SCSI) controller implemented, for example, using an Adaptec® AIC-7897 SCSI controller chip available from Adaptec, Inc. In other embodiments, however, a different peripheral device interface can be implemented. As mentioned above, peripheral device interface controllers are typically supplied with BIOS extension code that the designer of an adapter card that incorporates such a controller must provide the BIOS extension code on the adapter card so that the host computer system can load and execute the BIOS extension during its POST routine to enable it to support BIOS-level control of the peripheral device interface using calls to standard BIOS functions.

The standard BIOS extension code supplied with the peripheral device interface controller 48 is stored in the flash memory 38. During normal operation of the adapter card 18 and host computer system 14, the standard BIOS extension is copied from the flash memory 38 into a predetermined location in local RAM 40 from which the host computer system 14 then loads the BIOS extension during execution of its POST routine. At the conclusion of the POST routine, the host system BIOS 51 calls INT 19 h to invoke the host's operating system bootstrap loader, which causes the host operating system to boot. The host operating system then loads any driver software supplied by the peripheral device interface controller manufacturer. In this mode of operation, therefore, the host computer system 14 has control of the peripheral device interface controller 48 as it would any such adapter-based controller.

As mentioned above, however, according to an important feature of the present invention, a user at the remote computer system can override the normal operation of the adapter card to enable remote control of a peripheral device, such as a data storage device, connected to the peripheral device interface 48, in the absence of the host operating system. In a preferred embodiment of the present invention, this feature enables a user at the remote computer system 16 (i) to select any one of a plurality of disk drives attached to the peripheral device interface, (ii) to partition the selected disk drive, or (iii) to copy a bootable disk image to the selected disk drive.

Figure 2:
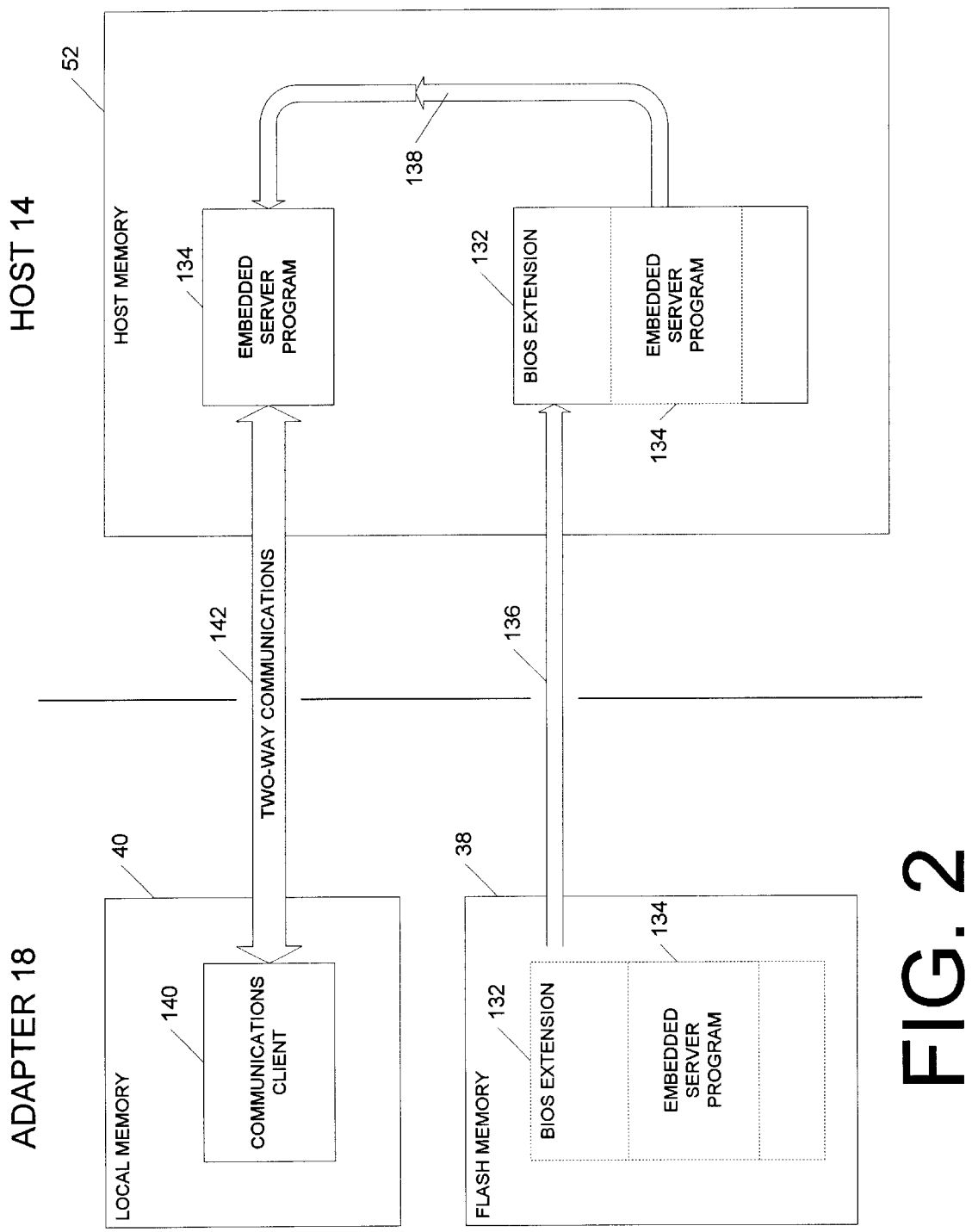
FIG. 2 graphically illustrates a method of the present invention.

As illustrated in FIG. 2, according to this aspect of the present invention, a modified BIOS extension 132 for the peripheral device interface controller is stored in the flash memory 38 on the adapter card in addition to the standard BIOS extension (not shown). The modified BIOS extension 132 comprises first program code that operates as described hereinafter, and second program code that defines a separate, server program 134 embedded within the modified BIOS extension. From the remote client program, a user at the remote computer system 16 can cause the modified BIOS extension 132 to be loaded in place of the standard BIOS extension during startup of the host computer system, as illustrated at step 136. When executed by the host processor 50, the first program code of the modified BIOS extension 132 copies the server program 134 (i.e., the second program code) embedded within it to a new location in host memory, as illustrated at step 138, and then hooks the new location of the server program 134 to the bootstrap loader interrupt of the host system BIOS (INT 19 h). When the system BIOS completes its execution and calls INT 19 h to initiate booting of the operating system, the server program 134 is executed instead of the host's bootstrap loader. As illustrated at step 142, the server program 134 then establishes two-way communications with a communications client 140 executing on the adapter card 18.

Because the server program is executing on the host processor 50, and because the host system BIOS 51 completes its normal execution, all of the callable functions of the system BIOS (invoked using the INT instruction), such as the keyboard services (INT 16 h), video services (INT 10 h), disk services (INT 13 h), serial communications services (INT 14 h), system services (INT 15 h), parallel printer services (INT 17 h), and others can be invoked by the server program 134. Thus, this aspect of the present invention provides a means to invoke the functionality of the host system BIOS via the communications between the communications client 140 on the adapter card 18 and the server program 134 on the host computer system 14. For example, to request the server program 134 to make a particular call to a system BIOS function, the communications client 140 can pass a pre-defined op-code for that function to the server program 134, along with any parameters required to carry out the function. The server program 134 can be coded to recognize the pre-defined op-code and to make the appropriate call to the desired system BIOS function. Any results can then be reported back to the communications client 140.

In the preferred embodiment described more fully hereinafter, this feature of the present invention is employed to enable a user at the remote computer system 16 to instruct the communications client 140 on the adapter card 18 to request the server program 134 to invoke the appropriate INT 13 h diskette services to perform the following operations: (i) select any one of a plurality of disk drives attached to the peripheral device interface, (ii) partition the selected disk drive, or (iii) copy a bootable disk image to the selected disk drive.

Figure 3:
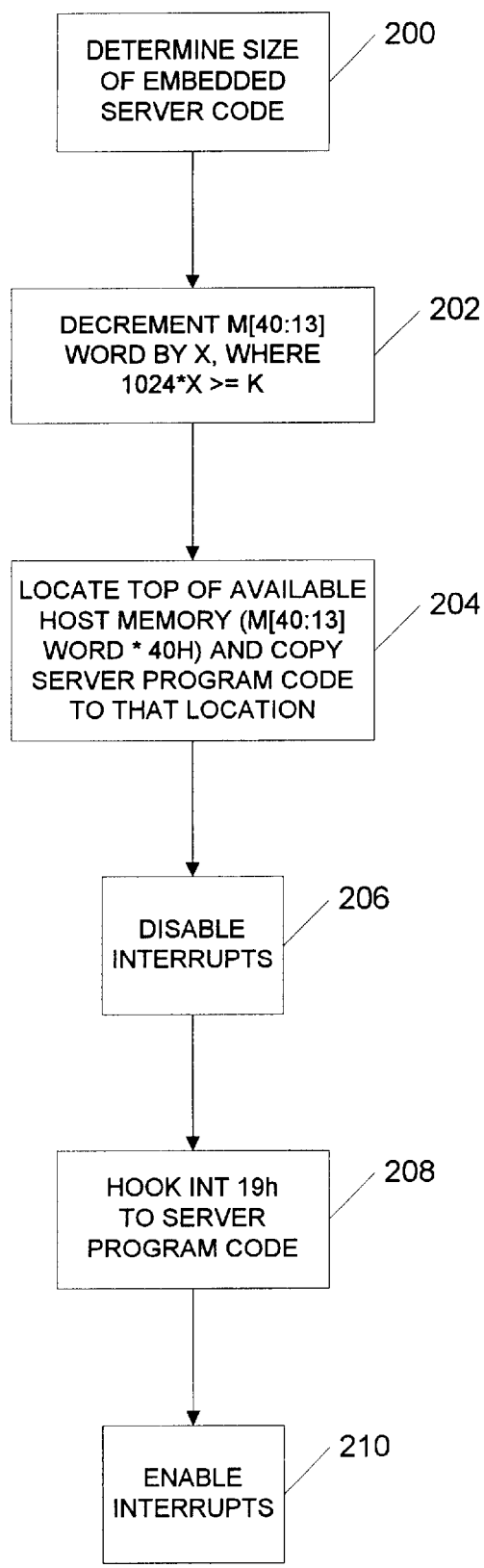
FIG. 3 is a flow diagram illustrating the operation of a modified BIOS extension of the present invention in accordance with a preferred embodiment thereof.

FIG. 3 illustrates the functions performed by the first program code of the BIOS extension 132 in accordance with the present invention, when executed by the host processor 50 during the POST routine of the system BIOS 51. In addition to the following steps, it is understood that the modified BIOS extension 132 of the present invention also provides the basic functionality of a standard BIOS extension for the peripheral device controller. In step 200, the first program code determines from a constant, K, embedded within the code at compile time, the size of the embedded server program code 134 (i.e., the second program code). In step 202, the first program code decrements the value stored at word 40:13 h of the host memory (designated M[40:13 h] WORD) to allocate a portion of host memory in which to copy the embedded server program code 134. In the industry standard PC architecture of the host computer system 14, the word at M[40:13 h] identifies the amount of available base memory in kilobytes as it is determined by the BIOS POST routine. When multiplied by 40 h, this value essentially provides a pointer to the top of available host memory (sometimes also referred to as the Top of DOS Memory). To allocate memory for the server program code 134 in step 202, the first program code decrements M[40:13 h] WORD by X, where (X*1024>K). Next, in step 204, the first program code locates the newly allocated portion of host memory 52 (M[40:13 h]*40 h) and then copies the embedded server program code 134 to that location, effectively extracting it from the BIOS extension 132.

Next, at step 206, the first program code disables all host system interrupts. At step 208, the first program code "hooks" the relocated server program code 134 to software interrupt 19 h (INT 19 h). This is done by copying the starting location of the server program code to the interrupt vector entry for INT 19 h. As mentioned above, in the industry standard PC architecture, INT 19 h is the software interrupt that is invoked to execute the operating system bootstrap loader in order to boot the operating system. The system BIOS normally invokes INT 19 h at the conclusion of its POST routine. By hooking this interrupt with the server program code 134, this aspect of the present invention will prevent the operating system from booting, causing the host processor 50 instead to begin executing the server program code 134. After hooking interrupt 19 h, the first program code re-enables all host system interrupts at step 210. At this point, control passes back to the system BIOS which completes its normal execution.

Figure 4:
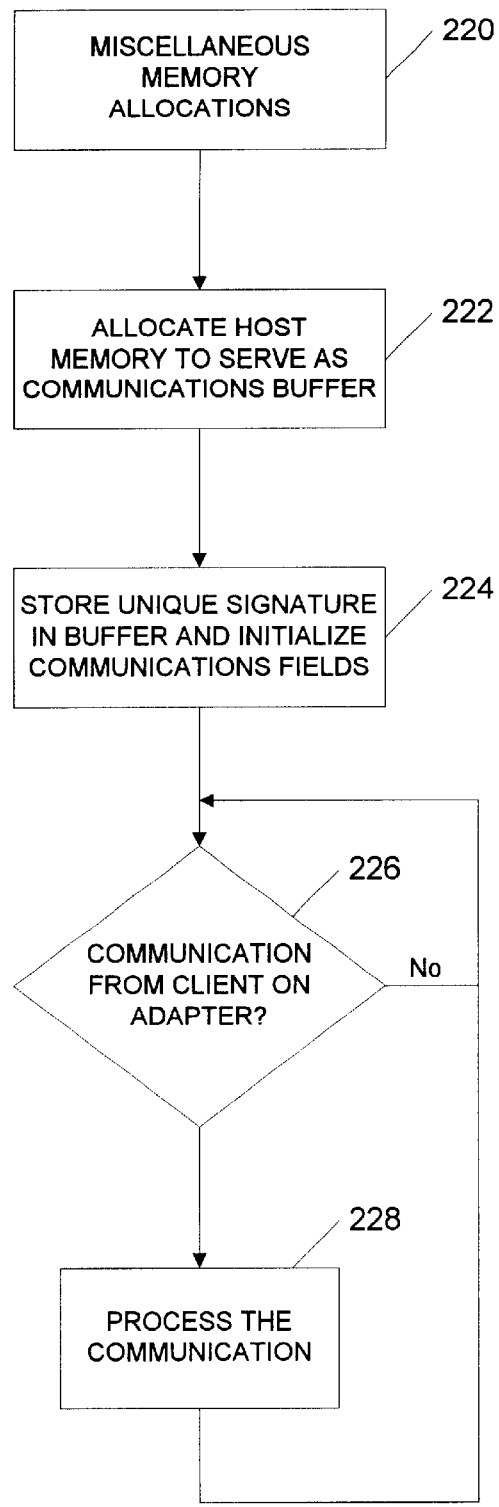
FIG. 4 is a flow diagram illustrating the operation of a server program of the present invention in accordance with the preferred embodiment.

FIG. 4 is a flow diagram illustrating further details of the operation of the server program code 134 in accordance with the preferred embodiment. As explained above, in this embodiment, execution of the server code 134 begins when the system BIOS calls INT 19 h at the conclusion of its POST routine. Referring to the Figure, at step 220, the server program 134 allocates portions of host memory to serve as temporary storage for variables and other data associated with the work that it must perform (e.g., temporary storage is needed to support various INT 13 h diskette service functions that the server program will perform). Next, at step 222, the server program 134 allocates an additional portion of host memory to serve as a communications buffer between the server program and the communications client (described hereinafter) executing on the adapter card 12. Specifically, the server program obtains the contents of host RAM location 40:13 h to again identify the top of available host memory. The server program then decrements that value based on the desired size of the communication buffer, thereby reserving that portion of the host memory as the communications buffer. At step 224, the server program 134 stores a unique signature (i.e., a predetermined pattern of data) in the communications buffer at a predefined offset from the start of the buffer. As described more fully hereinafter, the communications client 140 uses the value at location 40:13 h of host RAM 52 to identify where the communication buffer should be, but then relies upon the presence of the unique signature to ensure that the server program 134 has indeed created the buffer.

Next, at step 226, the server program 134 enters a loop to await communications from the communications client 140. Any communication received from the communications client will be processed at step 228, and the server program 134 will then loop back to await additional communications.

The communications client 140 (described hereinafter) and server program 134 use a portion of the communication buffer established by the server program 134 in step 222, as a shared memory region containing fields for controlling the exchange of information between them. Specifically, the shared memory region contains three fields designated O (for originator—in this case the communications client 140), T (for target—in this case the server program 134), and TR (for target ready). The O and T fields are used for handshaking, and the TR field is used to indicate that the target is ready to receive a communication from the originator. In the present embodiment, the communications client 140 has read and write access to the O field, but it can only read the T and TR fields. The server program 134 has read and write access to the T and TR fields, but it can only read the O field.

When communications are not occurring or needed, O=T=0, and TR=1. When the communications client is required to send information to the server program, it writes the information to the communication buffer and sets O=1. The communications client then waits for T=1.

When the server program 134 detects that O has been set to 1, it sets TR=0 and extracts the information from the buffer. In the present embodiment, the information extracted from the buffer will be a request for the server program to perform some operation and, if necessary, to send a result back to the communications client. If a result is needed, the server program 134 writes the result in the buffer. The server program 34 then sets T=1, and waits for the communications client to reset O to 0.

When the communications client 140 detects that T has been set to 1 by the server program 134, it reads any result from the buffer and sets O to 0 to acknowledge receipt of the result. When the server program 134 detects that O has been set to 0, it sets T=0 and TR=1. At this point the communications client 140 and server program 134 are ready for another communication. This originator/target protocol ensures race-condition free communications.

Figure 5:
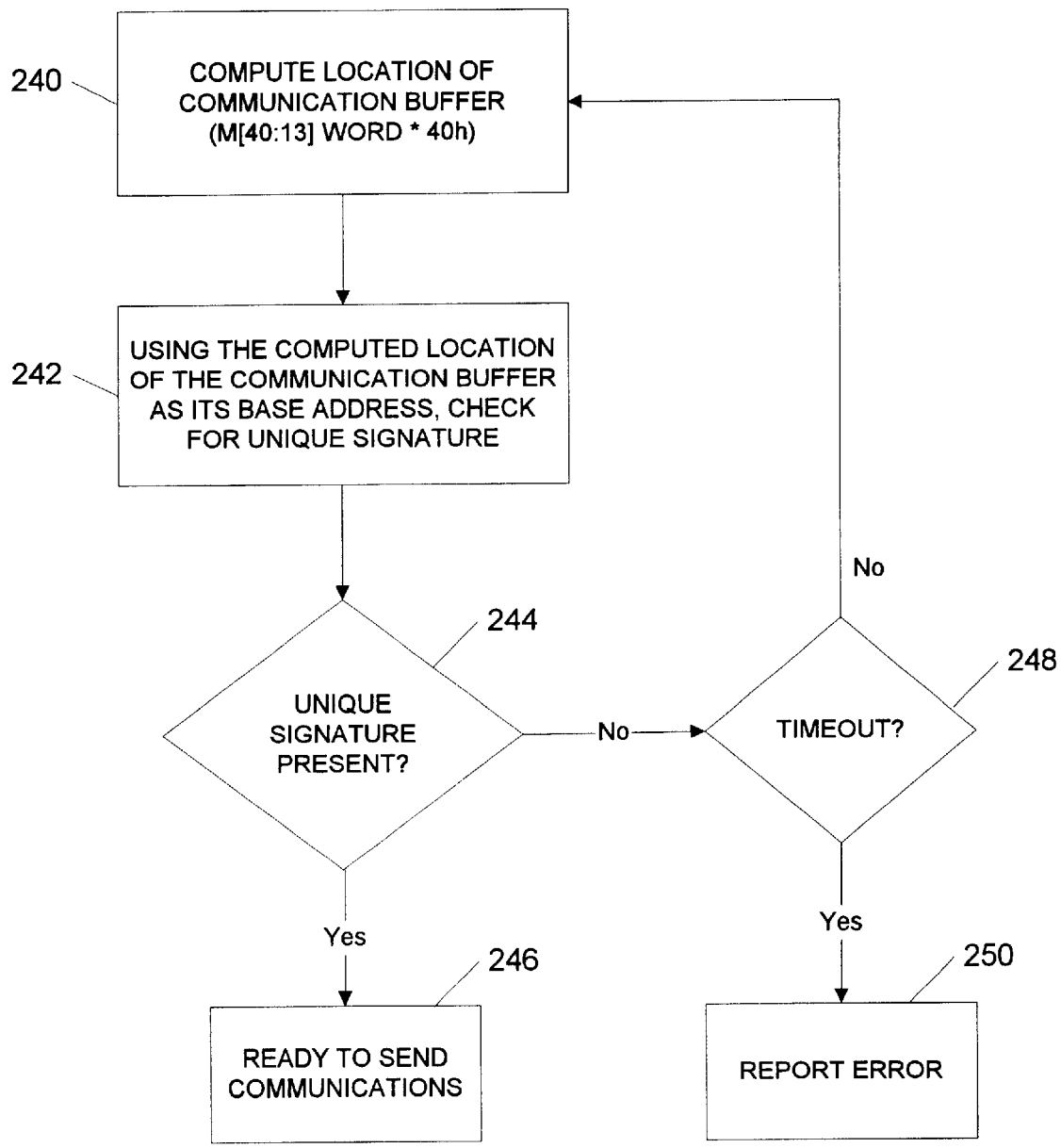
FIG. 5 is a flow diagram illustrating the operation of a communications client program of the present invention in accordance with the preferred embodiment.

FIG. 5 is a flow diagram providing fuirther details of the operation of the communications client 140 in accordance with the preferred embodiment. At step 240, the communications client 140 retrieves the value stored in the host memory at location 40:13 h (the top of available memory indicator). Because no other host system BIOS code should have changed that value after the server program 134 decrements it to define the communications buffer, the communications client 140 can rely upon the value in identifying the location of the start of the communication buffer. Specifically, the communications client 140 multiples the value at location 40:13 h by 40 h to compute the segment address for the start of the allocated communications buffer.

Next, at step 242, using the computed location of the start of the communications buffer as its base address, the communications client 140 looks for the unique signature written by the server program 134 in step 224 of FIG. 4, at the predefined offset from the base address. If at step 244, the signature is not found, it is assumed either (i) that a failure has occurred in the loading or execution of the BIOS extension 132 or in the execution of the server program 134, or (ii) that the BIOS extension 132 or server program 134 has not yet completed the steps necessary to establish the communications buffer. In the preferred embodiment, as illustrated at steps 248 and 250, the communications client 140 will continuously repeat steps 240 and 242 for a predetermined timeout period. If no signature is detected during the timeout period, the communications client will then report an error and terminate (step 250). In other embodiments, the communications client could simply report an error and terminate upon the initial failure to locate the signature.

As mentioned above, because the server program 134 is executing on the host processor 50, and because the present invention allows the system BIOS to complete its normal execution, all of the callable functions of the system BIOS (invoked using the INT instruction), such as the keyboard services (INT 16 h), video services (INT 10 h), disk services (INT 13 h), serial communications services (INT 14 h), system services (INT 15 h), parallel printer services (INT 17 h), and others can be invoked by the server program 134. In accordance with the present invention, therefore, the server program 134 can be coded to recognize pre-defined op-codes for the any system BIOS function that it can call. Thus, a user at the remote computer system 16 can use the communications client to send requests to the server program to control any peripheral device attached to the peripheral device controller 48 or to any other peripheral device supported by system BIOS functions.

In the preferred embodiment, this capability is utilized to enable a user at the remote computer system 16 to instruct the communications client 140 on the adapter card 18 to request the server program 134 to invoke the appropriate INT 13 h diskette services to perform the following operations: (i) select any one of a plurality of disk drives attached to the peripheral device interface, (ii) partition the selected disk drive, or (iii) copy a bootable disk image to the selected disk drive. Selecting a disk drive is performed using Int 13 h function 8. Partitioning a selected disk is performed using INT 13 h function 2 and 3, respectively, to first read the current Master Boot Record of the selected disk and then to write the updated Master Boot Record. Copying a bootable disk image to the selected disk drive is performed using INT 13 h function 3 to write the disk image to the appropriate partition sector-by-sector as it is received from the remote computer system.

The Remote Client Program

In the present embodiment, the remote client program comprises a browser that connects to the Web Server process executing on the adapter card 18 and serves as the administrative and control interface of the system 10, in combination with one or more software modules that implement the remote console functionality described above. In the present embodiment, any HyperText Transfer Protocol (HTTP) and HTML compliant browser can serve as the browser of the remote client program, including, for example, Microsoft® Internet Explorer or Netscape Navigator®. In the presently preferred embodiment, the remote console functionality (screen information interpretation and processing/keystroke and mouse movement gathering and transmission) is implemented as a browser add-in. In particular, in this embodiment, the remote console functionality is implemented as an ActiveX control. However, the functionality could alternatively be implemented, for example, as a plug-in for use with Netscape Navigator®, as a Java applet, or in some other form such as an executable program. Further description of the user interface implemented by the Web Server on the adapter card 18 and displayed by the browser of the remote client program is provided hereinafter.

While only a single, remote workstation is shown in FIG. 1, it is understood that multiple remote client programs, running on one or more different remote computer systems, may connect to and interact with a single adapter card 18, allowing remote console emulation for a given host computer system 14 to be performed from multiple locations on the network. Also, a given remote client program on a given remote computer system can be used to control any number of different adapter cards 18 in any number of different host computer systems 14. Thus, a single remote computer system 16 can be used to remotely administer multiple different host computer systems 14. Each remote client program and adapter card 18 is assigned a unique Internet Protocol(IP) address, thus providing unique identities across the network 12.

While in the present embodiment, the remote client program comprises a Web browser in combination with one or more software modules (e.g., ActiveX control, plug-in, Java Applet, etc.) that implement the remote console functionality described above, in other embodiments, the remote client program can be implemented in the form of a stand-alone computer program or application that handles both the administration and configuration of the adapter card 18 as well as the remote console functionality.

System Operation

Figure 6:
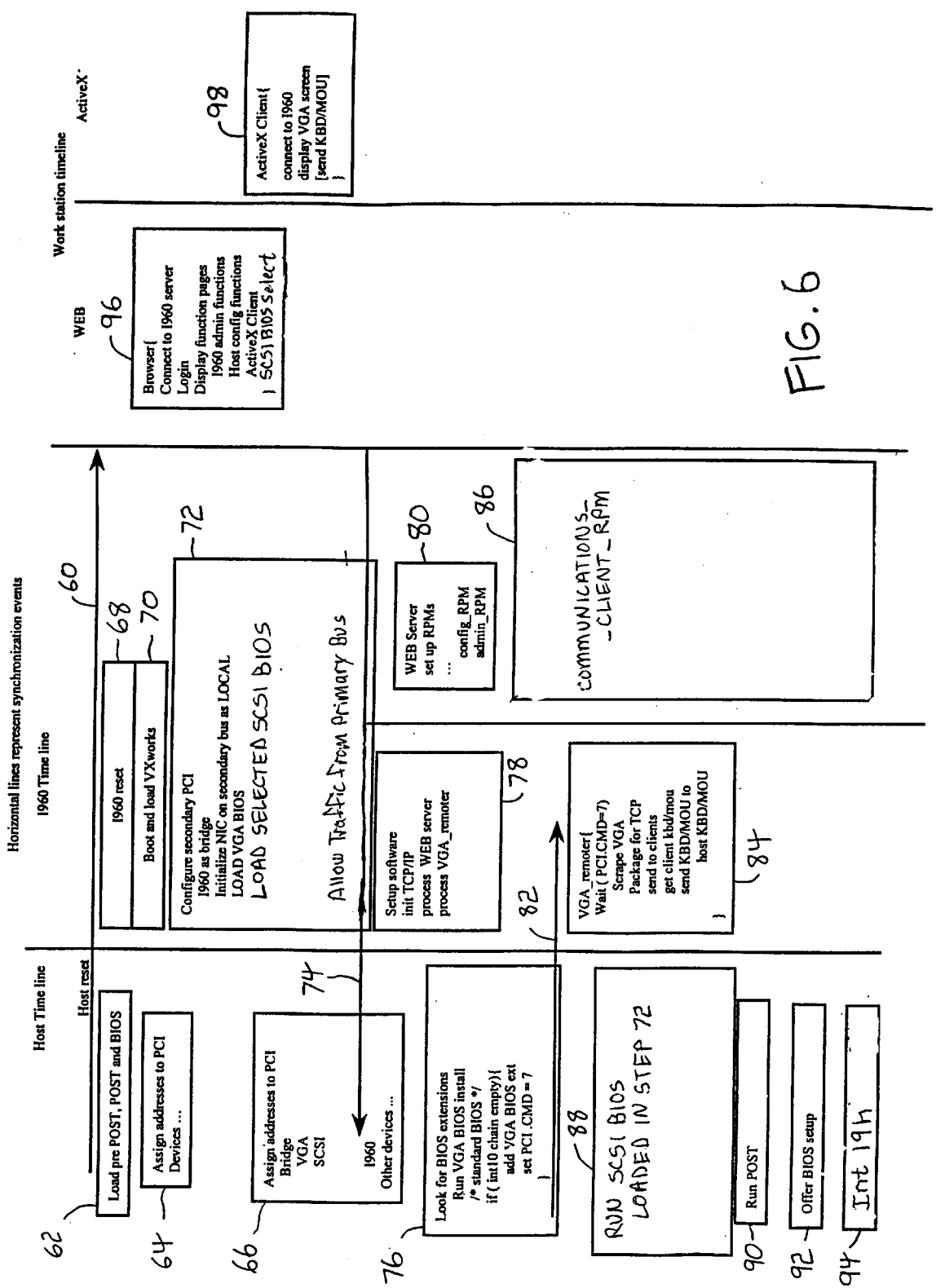
FIG. 6 is a flow diagram illustrating the operation of the system of FIG. 1.

FIG. 6 is a flow diagram illustrating further details concerning the operation of the system 10 of the present invention, including the adapter card 18 and the remote client program. The diagram of FIG. 6 provides a time line-indicating when certain events on the adapter card 18 and within the remote client program occur in relation to each other and to events on the host computer system 14. Certain horizontal lines in FIG. 6, for example, lines 60, 74, and 82, represent synchronization events. In this example, the processor 26, bridges 32 and 34, and the DMA controller 36 are implemented using the i960® RP microprocessor described above.

As shown, operation of the system of the present invention begins with the booting of the host computer system 14. Specifically, at step 62, the host computer system 14 is either powered-on or reset, causing it to load its pre-POST (Power On Self-Test), POST, and BIOS code, typically from a read-only memory (ROM) (not shown), and to begin executing that code. At step 64, the host computer 14 begins the process of assigning addresses to PCI devices connected to its I/O bus 20. As shown in greater detail in step 66, the host computer system 14 first assigns an address to the PCI bridge 30, and behind that, to the graphics controller (VGA) 22 and to the peripheral device interface controller (SCSI) 48. That process is held up, however, until the synchronization event indicated by line 74 occurs on the adapter card 18, as discussed below.

Line 60 in FIG. 2 signifies the first synchronization event, and thus, as indicated, simultaneously with step 62 on the host computer 14, at step 68, the processor 26 (which in the present embodiment is an I960® RP processor) on the adapter card 18 receives a reset signal. This causes the processor 26 to load and boot its embedded operating system from flash memory 38, as shown at step 70.

At step 72, the processor 26 performs various configuration tasks. First, the processor 26 configures the local bus segment 28a (a secondary PCI bus), as well as the bridges 32 and 34. The network interface controller 24 is then initialized on the bus segment 28a as a LOCAL device (i.e., not visible to the host CPU 50). The graphics controller BIOS (which in this example is a VGA BIOS) is loaded next into the host memory 52 by the host BIOS. The processor 26 then loads either the standard SCSI BIOS extension code for the controller 48 or the modified SCSI BIOS extension code of the present invention from the flash memory 38 to the location in the local memory 40 from which the host BIOS will load the extension into its host memory 52. As described hereinafter, the processor 26 normally loads the standard SCSI BIOS extension for the controller 48. However, in accordance with the present invention, a user at the remnote computer system 16 can select to have the modified SCSI BIOS extension loaded instead in order to take control of one or more disk drives (or other peripheral devices) connected to the peripheral device interface controller 48.

Once the selected SCSI BIOS extension code is loaded, the processor 26 enables communication between its local bus segment 28b and the primary local bus segment 28 through bridge 32. As indicated by line 74, this is a synchronization event, because communication across bridge 32 is necessary for the host computer system 14 to be able to assign a PCI address to the processor 26, which it subsequently does as illustrated in step 66.

After assigning addresses to other PCI devices that may be connected to its I/O bus 20, the host computer system 14 next looks for any VGA BIOS extensions (on its host I/O bus 20 and any subordinate buses; such as bus 28) and then runs its standard VGA BIOS install utility. Because the adapter card 18, and in particular the graphics controller 22 on the adapter card 18, is intended to serve as the primary graphics device of the host computer system 14, the interrupt 10 h (INT 10 h) chain of the host computer system 14 will be empty. As a result, the host computer system 14 will add the VGA BIOS extensions that were loaded by the adapter card in step 72 to the INT 10 h chain, and these extensions will in turn set the PCI.CMD environment variable to a value of 7 (i.e., set PCI.CMD=7). As illustrated by line 82, this represents another synchronization event because, as described below, the VGA_remoter( ) process waits on the setting of the PCI.CMD variable before performing its functions.

In step 88, the host computer runs the SCSI BIOS extension code (either the standard SCSI BIOS extension or the modified SCSI BIOS extension) that was loaded by the processor 26 in step 72. If the modified SCSI BIOS extension of the present invention was selected to be loaded by the user in step 72, it will perform the steps illustrated in FIG. 3. Otherwise, the standard SCSI BIOS extension code will execute.

The computer system then continues its normal boot process, including completing its POST routine (step 90), and offering the user an opportunity to enter the typical system BIOS setup (step 92). Finally, at step 94, the host computer system 14 attempts to boot the operating system by calling INT 19 h. If the standard SCSI BIOS extension was executed in step 88, then INT 19 h will invoke the host bootstrap loader to being loading the host operating system. However, if instead the modified SCSI BIOS extension of the present invention was executed in step 88, then the call to INT 19 h will instead invoke the server program code 134 of the present invention, which will then perform the steps illustrated in FIG. 4 to set up communications with the communications client 140 on the adapter card, as described above. In this case, the host operating system will not boot.

Referring again to the steps performed on the adapter card 18, after performing the task listed in step 72, the processor 26 initiates execution of setup software stored as program code in the flash memory 38. In greater detail, the setup software first initializes code that implements the TCP/IP protocol to enable communications between the network interface controller 24 and the remote client program via the network 12. The processor 26 then starts both the Web server process and the VGA_remoter( ) process as separate threads.

As shown at step 84, the VGA_remoter( ) process waits on the PCI.CMD variable. Once this variable is set to the appropriate value (PCI.CMD=7) by the host computer system 14 in step 76, the VGA_remoter( ) process begins its remote console functions. Specifically, as listed in step 84, at predetermined intervals, the VGA_remoter( ) process determines changes in the console screen representation generated by the graphics controller 22 using one of the alternative methods described above (referred to in step 84 as "Scrape VGA"), packages the changes into TCP/IP segments, and then sends those segments to the remote client program via the network interface controller 24. Additionally, the VGA_remoter( ) process periodically receives keyboard and mouse movement and click information from the remote client program via TCP/IP segments, converts them to keyboard/mouse controller queue entries, and then transmits them to the keyboard/mouse controller 46 of the host computer 46 as if they had been generated locally.

The WEB Server process is illustrated at step 80. In the present embodiment, in which the processor 26 runs the VxWorks® real-time operating system (RTOS) from Wind River Systems, the Web server is also supplied by Wind River Systems. In this embodiment, the WEB server makes use of Request Processing Modules(RPM), a feature of the Wind River Systems Web server. A Request Processing Module (RPM) is a module of one or more procedures that can be registered with the Web Server to be called when specific HTTP or HTML protocols or data strings are sent to the Web Server. Thus, in this embodiment, RPMs are the mechanism by which the functions chosen by a user at the remote client program are initiated and performed by the processor 26 on the adapter card 18. As shown in step 80, the Web Server sets up two RPMs to handle the administrative functions (admin_RPM) and the configuration functions (config_RPM) that a user at the remote client program can select. Additionally, another RPM (communications_client_RPM), shown separately as step 86, is registered with the Web Server. The communications_client_RPM implements the communications client 140 described above, which performs the steps illustrated in FIG. 5 when a user at the remote computer system 16 desired to control a peripheral device attached to the controller 48.

As explained above, the remote client program or interface at the remote computer system 16 consists of a browser and, in the presently preferred embodiment, an ActiveX control. As shown at step 96, the browser 96 is used to connect to the i960 Web Server, to enable a user to Login to the Web Server, to display the HTML pages that provide the administrative and configuration function options, including the SCSI BIOS selection feature of the present invention. The browser 96 also serves as the environment from which the ActiveX control is launched. The ActiveX control, as illustrated at step 98, handles receipt and interpretation of the screen information received from the adapter card 18, as well as gathering of keyboard and mouse information for transmission to the adapter card 18.

Figure 7:
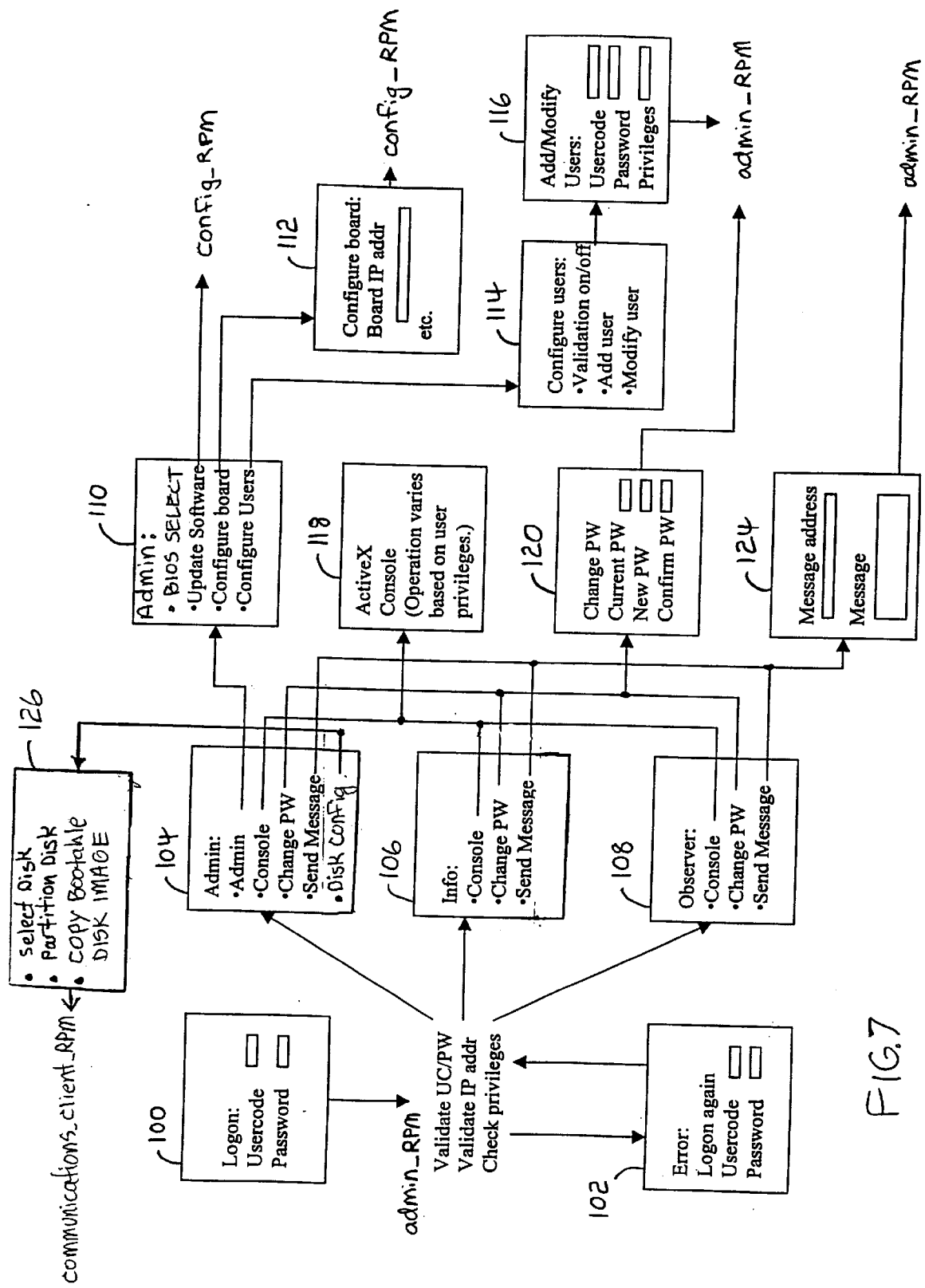
FIG. 7 illustrates a user interface of the system of FIG. 1, in accordance with one embodiment thereof.

FIG. 7 is a diagram illustrating one embodiment of a layout for the user interface implemented by the Web Server on the adapter card 18 and displayed by the browser of the remote client program. Each block in FIG. 3 represents a different HTML page that the Web Server presents to the browser. In the present embodiment, these HTML pages are stored in the flash memory 38. Block 100 represents the index page provided by the Web Server on the adapter card 18. This is the page shown when the browser first connects to the IP address of the adapter card. The index page 100 provides a form for the user to enter a usercode and password. After the usercode and password are entered, they are transmitted to the adapter card 18, where the processor 26 invokes procedures from the admin_RPM to validate the usercode/password combination and the IP address of the remote computer system 16. If the usercode/password combination is not validated, the user is presented with HTML page 102, which allows the user to reenter the data. If the validations are successful, the processor 26 determines what privileges the current user has. In the present embodiment, a user can have one of three levels of privilege: Administrator, Informational, or Observer. An Administrator-level user has access to all of the functionality of the adapter card. An Informational-level user is able to perform all operations, except those reserved to Administrators. An Observer-level user can only observe the console screen generated at the remote computer system 16 but does not have access to any configuration or administrative functions except for changing the user's password and sending messages to other remote client programs connected to the same adapter card 18. Based on the user's privilege level, one of three HTML pages 104, 106, or 108 is presented to the user by the Web Server. An Administrator-level user receives HTML page 104, an Informational-level user receives HTML page 106, and an Observer-level user receives HTML page 108.

Referring to the HTML page 104 for an Administrator-level user, the user at this level has the following options: Admin, Console, Change PassWord(PW), Send Message, and Disk Configuration. Selecting the Admin option brings up HTML page 110, which gives the user the following additional options: Select SCSI BIOS, Update Software, Configure Board, and Configure Users. Selecting the Select SCSI BIOS option allows the user to select to have the processor 26 on the adapter card load either the standard SCSI BIOS extension or the modified SCSI BIOS extension of the present invention. Once the selection is made, the user can also cause the host computer system to reboot so that the newly selected SCSI BIOS extension will be executed by the host computer system 14 in step 88 (FIG. 6). Thus, this is how a user invokes the functionality of the present invention. Selecting the Update Software option invokes a procedure in the config_RPM on the adapter card 18 that allows the user to transfer new software (i.e., program code) to the adapter card 18 in order to, for example, upgrade the software on the adapter card 18. The Configure Board option brings up an additional HTML page 112 that provides certain configuration options, such as, for example, the ability to set the IP address of the adapter card 18. As illustrated, that option would invoke a procedure in the config_RPM on the adapter card 18 which would store the new IP address in the appropriate location on the adapter card 18. The Configure Users option in HTML page 110 links to additional HTML pages 114 and 116 that provide options for turning user validation on and off, adding new usercode and password combinations, modifying existing usercode and password combinations, and changing the privilege level of a given user. Appropriate procedures in the admin-RPM will be invoked to carry out the requested changes or additions.

Referring again to the initial Administrator-level HTML page 104, the next choice is Console. Selecting this option launches the ActiveX control of the remote client program, which reproduces the console screen of the host computer system 14 in a window or frame on the monitor of the remote computer system 16 based on the information received from the adapter card 18, and which gathers and transmits keystroke and mouse information to the adapter card 18. The functionality of the ActiveX control may vary depending upon the privilege level of the user. For example, an Observer-level user may be able to view the reproduced console screen, but the keystroke and mouse movement capabilities may be disabled, thus preventing the user from interacting with the host computer system 14.

Still referring to the Administrator HTML page 104, the Change Password option links to an additional HTML page 120 that provides a.form for changing the user's password. Again, a procedure in the admin_RPM on the adapter card 18 will be invoked to carryout the requested change.

In the present embodiment, a Send Message option is also provided. Because as mentioned above, more than one remote workstation can connect to a given adapter card 18, it is desirable to provide a simple message passing mechanism between the remote client programs at each separate location. This option allows a user at one remote workstation that is attached to an adapter card 18 to enter the network address of another remote workstation attached to the same adapter card 18 and to pass a brief text message to the other user. The message passing functionality is implemented as one or more procedures in the admin_RPM on the adapter card 18.

The last option available to an Administrator-level user is the Disk Configuration option which supports the peripheral device control functionality of the present invention—in this case, control of a disk drive connected to the peripheral device interface controller 48 (e.g., disk 15a or 15b of FIG. 1). Because this option requires that the modified SCSI BIOS extension of the present invention, the user must first access HTML page 110 via the Admin option of page 104 in order to choose to have the modified SCSI BIOS extension loaded and the host computer system then reset. If this has not been done, the Disk Configuration option will not be active.

Assuming that the modified SCSI BIOS extension has been executed, selecting the Disk Configuration option brings up another HTML page 126 with the choices available in accordance with this aspect of the present invention.

The Select Disk option allows the user to select a storage medium (e.g., disk unit) attached to the SCSI controller 48. As described above, selecting this option will cause the communications_client_RPM on the adapter card to send a request to the server program 134 on the host computer system to call the appropriate INT 13 h function to select a particular disk drive. The Partition Disk option allows the user to partition the selected disk unit, again by causing the server program 134 to call the appropriate INT 13 h function to perform that operation. The Copy Bootable Disk Image option allows the user to have a bootable disk image stored on the remote computer system to be copied to the selected disk drive. Again, this is achieved by invoking the appropriate INT 13 h functionality via the communications_client_RPM and the server program 134, using the communications buffer established by the server program 134 to transfer the data of the bootable disk image. This option thus allows a remote user to install a new bootable disk image to a disk drive of the host computer system, from which the host computer system can then be rebooted. This is a powerful administrative and maintenance tool.

The options available to an Informational-level user are shown in the HTML page 106. As illustrated, an Informational-level user will be able to perform the Console, Change Password, and Send Message operations described above. However, an Informational-level user will not be able to perform the Admin operations that are available to an Administrator-level user.

The options available to an Observer-level user are shown in the HTML page 108. As illustrated, an Observer-level user will be able to perform the Console, Change Password, and Send Message operations described above. However, an Observer-level user may only be able to view the console, without the ability to interact with it via mouse or keyboard.

As the foregoing illustrates, the present invention is directed to a system, method, and adapter card, for providing remote control or emulation of a console of a host computer system from another remotely located computer system over a network, including in particular, the ability to remotely control a peripheral device connected to the host computer system. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

Intel and i960 are registered trademarks of Intel Corporation. VxWorks is a registered trademark of Wind River Systems. Microsoft, Windows, Windows NT and/or other Microsoft products referenced herein are either trademarks or registered trademarks of Microsoft Corporation. Pentium, Itanium, and Intel are either trademarks or registered trademarks of Intel, Inc. Navigator is a registered trademark of Netscape Communications Corporation. Java is a trademark of Sun Microsystem, Inc.

What is claimed is:

1. A system for providing from a remote computer system, over a network, remote control of a peripheral device of a host computer system, wherein the host computer system has a processor, a memory, and a binary input/output system (BIOS) that supports the loading of BIOS extensions into the host memory for execution by the host processor, the system comprising:

an adapter card comprising:
  a processor;
  a network interface controller providing an interface to the network;
  a peripheral device interface controller to which the peripheral device is connected;
  a communications client program executing on said processor of the adapter card; and
  at least one computer-readable medium having stored therein a BIOS extension for said peripheral device interface comprising first program code and second program code, the second program code being embedded within the first program code and defining a separate server program, the BIOS extension being loaded into the host memory during execution of the host computer system BIOS,
  the first program code of the BIOS extension, when executed by the host processor, performing the following steps:
    (i) copying the second program code defining the server program to a new location in the host memory; and
    (ii) hooking the new location of the server program to an interrupt of the host computer system to cause the host processor to initiate execution of the server program on the host computer system upon a subsequent occurrence of that interrupt,
  the server program, when executed on the host processor, establishing communications with the communications client program on the adapter card; and
  a remote client program executing on the remote computer system from which a user can instruct, via the network interface to the adapter card, the communications client program to request the server program to invoke the functionality of the host computer system BIOS to control the peripheral device.

2. The system recited in claim 1, wherein the peripheral device comprises a data storage device, and wherein remote control of the data storage device comprises at least one of:
  (a) selecting the data storage device;
  (b) partitioning the data storage device; and
  (c) copying a bootable disk image to the data storage device.

3. The system recited in claim 2, wherein the data storage device is controlled by instructing the communications client program to request the server program to invoke the corresponding INT 13 h diskette services functions of the host computer system BIOS.

4. The system recited in claim 1, wherein said network interface controller implements an Ethernet protocol.

5. The system recited in claim 1, wherein said peripheral device interface controller comprises a Small Computer Systems Interface (SCSI) controller.

6. The system recited in claim 1, wherein said adapter card further comprises a Web server program providing, via said network interface controller, an interface between the remote client program on the remote computer system and the communications client program on the adapter card.

7. The system recited in claim 1, wherein the first program code of the BIOS extension hooks the new location of the server program to the operating system bootstrap loader interrupt of the host computer system, thereby causing said server program to be executed upon the occurrence of that interrupt instead of the operating system bootstrap loader of the host computer system.

8. The system recited in claim 1, wherein the copying step performed by the first program code of the BIOS extension comprises:
   (i) determining the size of the second program code from a constant, K, embedded within the first program code;
   (ii) decrernenting, by an amount greater than or equal to K, a value stored in host memory that provides an indicator of the top of available host memory, thereby allocating that portion of host memory; and
   (iii) copying the second program code to the allocated portion of host memory.

9. The system recited in claim 1, wherein the server program, when executed on the host processor, performs the followings steps to establish communications with the communications client program on the adapter card:
   (a) allocates a portion of the host memory to serve as a communications buffer; and
   (b) stores a unique signature in the allocated communications buffer at a predetermined location therein.

10. The system recited in claim 9, wherein said allocation step comprises decrementing a value stored in host memory that provides an indicator of the top of available host memory.

11. The system recited in claim 9, wherein the communications client program, when executed on said processor of the adapter card, performs the following steps:
   (a) locates the communications buffer using the indicator of the top of available host memory; and
   (b) determines whether the unique signature has been stored at said predetermined location therein to verify that the communications buffer has been created by the server program.

12. A method for remotely controlling, over a network, a peripheral device connected to a peripheral device interface controller of an adapter card of a host computer system in the absence of a host operating system, wherein the adapter card has a local processor and a network interface controller that provides a connection to the network, and wherein the host computer system has a processor, a memory, and a binary input/output system (BIOS) that supports the loading of BIOS extensions into the host memory for execution by the host processor, the method comprising:
   a) executing a communications client program on the processor of the adapter card;
   b) causing a BIOS extension stored in a computer-readable medium on the adapter card to be loaded into the memory of the host computer system during execution of the host computer system BIOS, the BIOS extension comprising first program code and second program code, the second program code being embedded within the first program code and defining a separate server program, the first program code of the BIOS extension, when executed by the host processor, performing the following steps:
      (i) copying the second program code defining the server program to a new location in the host memory; and
      (ii) hooking the new location of the server program to an interrupt of the host computer system to cause the host processor to initiate execution of the server program on the host computer system upon a subsequent occurrence of that interrupt, the server program, when executed by the host processor, establishing communication with the communications client program executing on the adapter card; and
   c) instructing, via the network interface to the adapter card, the communications client program to request the server program to invoke the functionality of the host computer system BIOS to control the peripheral device.

13. The method recited in claim 12, wherein the peripheral device comprises a data storage device, and wherein remote control of the data storage device comprises at least one of:
   (c) selecting the data storage device;
   (d) partitioning the data storage device; and
   (e) copying a bootable disk image to the data storage device.

14. The method recited in claim 13, wherein the data storage device is controlled by instructing the communications client program to request the server program to invoke the corresponding INT 13 h diskette services functions of the host computer system BIOS.

15. The method recited in claim 12, wherein the first program code of the BIOS extension hooks the new location of the server program to the operating system bootstrap loader interrupt of the host computer system, thereby causing said server program to be executed upon the occurrence of that interrupt instead of the operating system bootstrap loader of the host computer system.

16. The method recited in claim 12, wherein the copying step performed by the first program code of the BIOS extension comprises:
   (i) determining the size of the second program code from a constant, K, embedded within the first program code;
   (ii) decrementing, by an amount greater than or equal to K, a value stored in host memory that provides an indicator of the top of available host memory, thereby allocating that portion of host memory; and
   (iii) copying the second program code to the allocated portion of host memory.

17. The method recited in claim 12, wherein the server program, when executed on the host processor, performs the followings steps to establish communications with the communications client program on the adapter card:
   (a) allocates a portion of the host memory to serve as a communications buffer; and
   (b) stores a unique signature in the allocated communications buffer at a predetermined location therein.

18. The method recited in claim 17, wherein said allocation step comprises decrementing a value stored in host memory that provides an indicator of the top of available host memory.

19. The method recited in claim 17, wherein the communications client program, when executed on the adapter card, performs the following steps:
   (a) locates the communications buffer using the indicator of the top of available host memory; and
   (b) determines whether the unique signature has been stored at said predetermined location therein to verify that the communications buffer has been created by the server program.

20. An adapter card for providing, via a network, remote control of a peripheral device of a host computer system in the absence of a host operating system, the host computer system having a processor, a memory, and a binary input/output system (BIOS) that supports the loading of BIOS extensions into the host memory for execution by the host processor, the adapter card comprising:

a processor;

a network interface controller providing a connection to the network;

a peripheral device interface controller to which the peripheral device is connected;

a communications client program executing on said processor; and at least one computer-readable medium having stored therein a BIOS extension for said peripheral device interface comprising first program code and second program code, the second program code being embedded within the first program code and defining a separate server program, the BIOS extension being loaded into the host memory during execution of the host computer system BIOS, the first program code of the BIOS extension, when executed by the host processor, performing the following steps:

(i) copying the second program code defining the server program to a new location in the host memory; and (ii) hooking the new location of the server program to an interrupt of the host computer system to cause the host processor to initiate execution of the server program on the host computer system upon a subsequent occurrence of that interrupt, the server program, when executed on the host processor, establishing communications with the communications client program on the adapter card, and, thereafter, upon receipt of requests from the communications client program, invoking functions of the host computer system BIOS to control the peripheral device.

21. The adapter card recited in claim 20, wherein the peripheral device comprises a data storage device, and wherein remote control of the data storage device comprises at least one of:

(e) selecting the data storage device;

(f) partitioning the data storage device; and (c) copying a bootable disk image to the data storage device.

22. The adapter card recited in claim 21, wherein the data storage device is controlled by instructing the communications client program to request the server program to invoke the corresponding INT 13 h diskette services functions of the host computer system BIOS.

23. The adapter card recited in claim 20, wherein said network interface controller implements an Ethernet protocol.

24. The adapter card recited in claim 20, wherein said peripheral device interface controller comprises a Small Computer Systems Interface (SCSI) controller.

25. The adapter card recited in claim 20, wherein said adapter card further comprises a Web server program providing, via said network interface controller, an interface between the remote client program on the remote computer system and the communications client program on the adapter card.

26. The adapter card recited in claim 20, wherein the first program code of the BIOS extension hooks the new location of the server program to the operating system bootstrap loader interrupt of the host computer system, thereby causing said server program to be executed upon the occurrence of that interrupt instead of the operating system bootstrap loader of the host computer system.

27. The adapter card recited in claim 20, wherein the copying step performed by the first program code of the BIOS extension comprises:

(i) determining the size of the second program code from a constant, K, embedded within the first program code;

(ii) decrementing, by an amount greater than or equal to K, a value stored in host memory that provides an indicator of the top of available host memory, thereby allocating that portion of host memory; and (iii) copying the second program code to the allocated portion of host memory.

28. The adapter card recited in claim 20, wherein the server program, when executed on the host processor, performs the followings steps to establish communications with the communications client program on the adapter card:

(a) allocates a portion of the host memory to serve as a communications buffer; and (b) stores a unique signature in the allocated communications buffer at a predetermined location therein.

29. The adapter card recited in claim 28, wherein said allocation step comprises decrementing a value stored in host memory that provides an indicator of the top of available host memory.

30. The adapter card recited in claim 28, wherein the communications client program, when executed on said processor of the adapter card, performs the following steps:

(a) locates the communications buffer using the indicator of the top of available host memory; and (b) determines whether the unique signature has been stored at said predetermined location therein to verify that the communications buffer has been created by the server program.

\* \* \* \* \*